(12) United States Patent
Sridhar et al.

(10) Patent No.: US 12,387,729 B2
(45) Date of Patent: Aug. 12, 2025

(54) INTELLIGENT VOICE ASSISTANT

(71) Applicant: FMR LLC, Boston, MA (US)

(72) Inventors: Vaishnavi Mysore Sridhar, Karnataka (IN); Anupriya Gupta, Uttar Pradesh (IN); Gunjan Narulkar, Karnataka (IN); Ankur Jaiswal, Maharashtra (IN); Suwetha Selvakumar, Tamil Nadu (IN); Mari Pavithra, Tamil Nadu (IN)

(73) Assignee: FMR LLC, Boston, MA (US)

( * ) Notice: Subject to any disclaimer, the term of this patent is extended or adjusted under 35 U.S.C. 154(b) by 496 days.

(21) Appl. No.: 18/086,742

(22) Filed: Dec. 22, 2022

(65) Prior Publication Data

US 2024/0212684 A1 Jun. 27, 2024

(51) Int. Cl.
*G10L 15/26* (2006.01)
*G10L 15/02* (2006.01)
*H04M 3/51* (2006.01)

(52) U.S. Cl.
CPC .............. *G10L 15/26* (2013.01); *G10L 15/02* (2013.01); *H04M 3/5175* (2013.01); *G10L 2015/025* (2013.01)

(58) Field of Classification Search
None
See application file for complete search history.

(56) References Cited

U.S. PATENT DOCUMENTS

| | | | |
|---|---|---|---|
| 2009/0216740 A1* | 8/2009 | Ramakrishnan | G06F 16/3343 707/999.005 |
| 2016/0275945 A1* | 9/2016 | Elisha | G06F 16/638 |
| 2021/0312900 A1* | 10/2021 | Lalithsena | G06F 16/337 |
| 2021/0350795 A1* | 11/2021 | Kenter | G10L 15/02 |
| 2022/0156298 A1* | 5/2022 | Mahmoud | G06F 16/9535 |

OTHER PUBLICATIONS

"Cmusphinx / G2pse2seq", GitHub, Inc., Retrieved from the Internet: <https://github.com/cmusphinx/g2p-seq2seq>, Retrieved from the Internet on: Mar. 23, 2023, pp. 1-6.
"NVIDIA / NeMo", GitHub, Inc., Retrieved from the Internet: <https://github.com/NVIDIA/NeMo>, Retrieved from the Internet on: Mar. 23, 2023, pp. 1-6.
"Phonemes", Wikipedia, Retrieved from the Internet: <https://en.wikipedia.org/wiki/Phoneme>, Retrieved from the Internet on: Mar. 23, 2023, pp. 1-13.
"Siamese Neural Network", Wikipedia, Retrieved from the Internet: <https://en.wikipedia.org/wiki/Siamese_neural_network>, Retrieved from the Internet on: Mar. 23, 2023, pp. 1-4.

* cited by examiner

*Primary Examiner* — Nafiz E Hoque
(74) *Attorney, Agent, or Firm* — Cesari and McKenna, LLP

(57) ABSTRACT

A computer-implemented method is provided for recommending at least one pertinent electronic document for supporting a call between a customer and an agent. The method includes converting in real time content of the call between the customer and the agent from speech to digitized text, isolating a predefined number of words in the digitized text of the converted call content as the call is in progress and converting the predefined number of words in text to a phoneme sequence. The method also includes identifying at least one probable business category associated with the phoneme sequence and detecting sections of one or more documents associated with the probable business category that are similar to the content of the call.

20 Claims, 5 Drawing Sheets

INTELLIGENT VOICE ASSISTANT

BACKGROUND

Technical Field

This application generally relates to systems, methods and apparatuses, including computer program products, for automatically recommending at least one pertinent electronic document for supporting a call between a customer and an agent.

Background Information

In recent years, there is a significant increase of customer calls across many organizations, which can be a strain in the companies' systems and resources. Traditionally, customer service representatives need to manually search for answers to customer questions during a customer call. While a company can expedite the process by onboarding new customer representatives at an accelerated pace, there is also an opportunity to reduce the call-time per customer to accommodate more calls per customer representative while maintaining overall customer satisfaction.

SUMMARY

The instant invention provides customer representatives of an organization with a tool for resolving customer queries in as little time as possible. It enables real-time (or near real-time) speech-to-text conversion, along with real-time (or near real-time) determination of relevant topic(s) and retrieval of electronic document(s), including appropriate sections of the documents, for quick perusal by the customer representatives as conversations between the representatives and customers unfold. Therefore, the instant invention saves a significant amount of time for the representatives who would otherwise need to manually search for these answers.

In one aspect, the present invention features a computer implemented method for recommending at least one pertinent electronic document for supporting a call between a customer and an agent. The method includes converting in real time, by a computing device, content of the call between the customer and the agent from speech to digitized text, isolating, by the computing device, a predefined number of words in the digitized text of the converted call content as the call is in progress, and converting, by the computing device, the predefined number of words in text to a phoneme sequence. The method also includes identifying, by the computing device, at least one probable business category associated with the phoneme sequence. The probable business category is associated with one or more documents. The method additionally includes detecting, by the computing device, sections of the one or more documents that are similar to the content of the call. The method further includes ranking, by the computing device, the one or more documents based on corresponding degrees of relevancy between the similar sections of respective ones of the documents and the content of the call and presenting, by the computing device, the ranking to the agent during the call via a user interface.

In another aspect, the present invention features a computer-implemented system for recommending at least one pertinent electronic document for supporting a call between a customer and an agent. The computer-implemented system comprises a computing device having a memory for storing instructions. The instructions, when executed, configure the computer-implemented system to provide a speech transcription module configured to convert in real time content of the call between the customer and the agent from speech to digitized text, a batching module configured to isolate a predefined number of words in the digitized text of the converted call content as the call is in progress, and a phoneme conversion module configured to convert the predefined number of words in text to a phoneme sequence. The instructions, when executed, configure the computer-implemented system to also provide a phoneme-based domain detection module configured to identify at least one probable business category associated with the phoneme sequence. The probable business category is associated with one or more documents. The instructions, when executed, configure the computer-implemented system to further provide a phoneme based similarity detection module configured to detect sections of the one or more documents that are similar to the content of the call and a user interface configured to present to the agent during the call a ranking of the one or more documents based on corresponding degrees of relevancy between the similar sections of respective ones of the documents and the content of the call.

Any of the above aspects can include one or more of the following features. In some embodiments, the similar document sections are determined in batches in real time as the call progresses, where each batch relates to the predetermined number of words isolated from the call as the call progresses.

In some embodiments, converting the predefined number of words from text to a phoneme sequence comprises applying a trained transformer model based on neural networks that is configured to convert (i) the predefined number of words to a grapheme representation and (ii) the grapheme representation to the phoneme sequence.

In some embodiments, identifying the at least one probable business category comprises applying a multi-stage convolutional neural network trained to predict relationships between phoneme sequences and business domains. In some embodiments, detecting the sections of the one or more documents that are similar to the content of the call comprises applying a Siamese bidirectional long short term memory (LSTM) network model to capture phrase similarity using phoneme embedding. In some embodiments, the Siamese bidirectional LSTM model is trained to detect similarities in phoneme representations of text.

In some embodiments, the user interface includes: (i) a chat transcription section displaying in real time client-side conversation to the agent and (ii) a domain section identifying the at least one business category pertinent to the conversation displayed in the chat transcriptions section. In some embodiments, the user interface further comprises a Top Results section configured to display links to the documents in the at least one pertinent business category that include the similar content. The links are ranked in accordance with the corresponding degrees of relevancy between the documents and the content of the call. In some embodiments, the similar content of each linked document is highlighted within each document. In some embodiments, the user interface is updated as the call progresses with updated client-side conversation as well as business category identification and similar content identification pertinent to the updated conversation.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
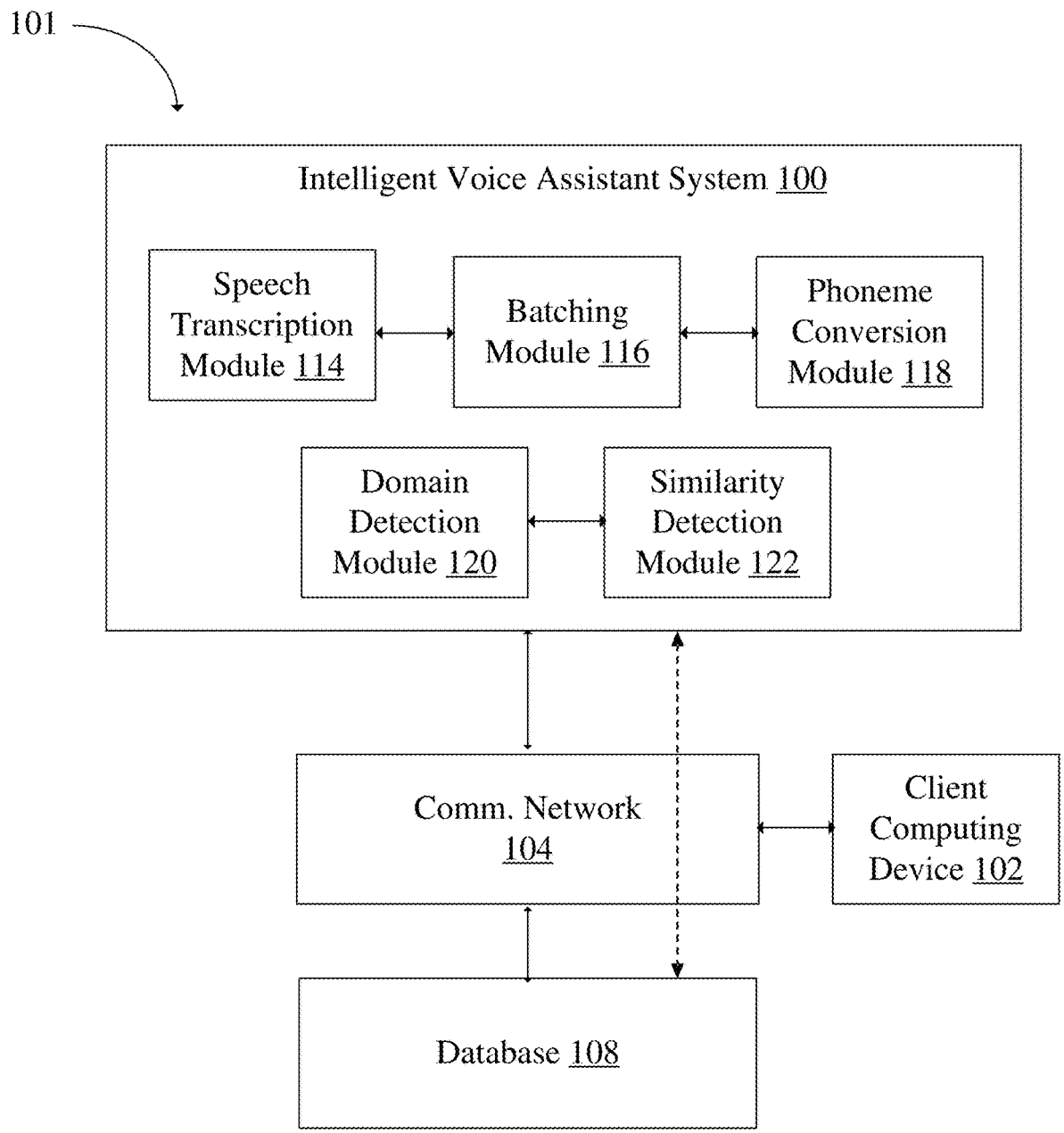
FIG. 1 shows an exemplary diagram of an intelligent voice assistant system, according to some embodiments of the present invention.

FIG. 1 shows an exemplary diagram of an intelligent voice assistant system 100 used in a computing environment 101 for automatically determining information pertinent to call content between an agent and customer, according to some embodiments of the present invention. As shown, the computing environment 101 generally includes at least one client computing device 102, a communication network 104, the intelligent voice assistant system 100, and at least one database 108.

The client computing device 102 can be associated with a call agent. The client computing device 102 can connect to the communication network 104 to communicate with the intelligent voice assistant system 100 and/or the database 108 to provide inputs and receive outputs for display to the call agent. For example, the computing device 102 can provide a detailed graphical user interface (GUI) that displays information relevant to call content extracted during a call in real-time (or near real-time) using the analysis methods and systems described herein. Exemplary computing devices 102 include, but are not limited to, telephones, desktop computers, laptop computers, tablets, mobile devices, smartphones, and internet appliances. It should be appreciated that other types of computing devices that are capable of connecting to the components of the computing system 101 can be used without departing from the scope of invention. Although FIG. 1 depicts a single computing device 102, it should be appreciated that the computing system 101 can include any number of client devices for communication by any number of call agents associated with an enterprise.

The communication network 104 enables components of the computing environment 101 to communicate with each other to perform the process of relevant call information determination. The network 104 may be a local network, such as a LAN, or a wide area network, such as the Internet and/or a cellular network. In some embodiments, the network 104 is comprised of several discrete networks and/or subnetworks (e.g., cellular to Internet) that enable the components of the system 100 to communicate with each other.

The intelligent voice assistant system 100 is a combination of hardware, including one or more processors and one or more physical memory modules and specialized software engines that execute on the processor of the intelligent voice assistant system 100, to receive data from other components of the computing environment 101, transmit data to other components of the computing environment 101, and perform functions as described herein. As shown, the intelligent voice assistant system 100 executes a speech transcription module 114, a batching module 116, a phoneme conversion module 118, a domain detection module 122 and a similarity detection module 124. These sub-components and their functionalities are described below in detail. In some embodiments, the various components of the intelligent voice assistant system 100 are specialized sets of computer software instructions programmed onto a dedicated processor in the intelligent voice assistant system 100 and can include specifically-designated memory locations and/or registers for executing the specialized computer software instructions.

The database 108 is a computing device (or in some embodiments, a set of computing devices) that is coupled to and in communication with the intelligent voice assistant system 100 and is configured to provide, receive and store various types of data received and/or created for determining information relevant to call content, as described below in detail. In some embodiments, all or a portion of the database 108 is integrated with the intelligent voice assistant system 100 or located on a separate computing device or devices. For example, the database 108 can comprise one or more databases, such as MySQL™ available from Oracle Corp. of Redwood City, California.

Figure 2:
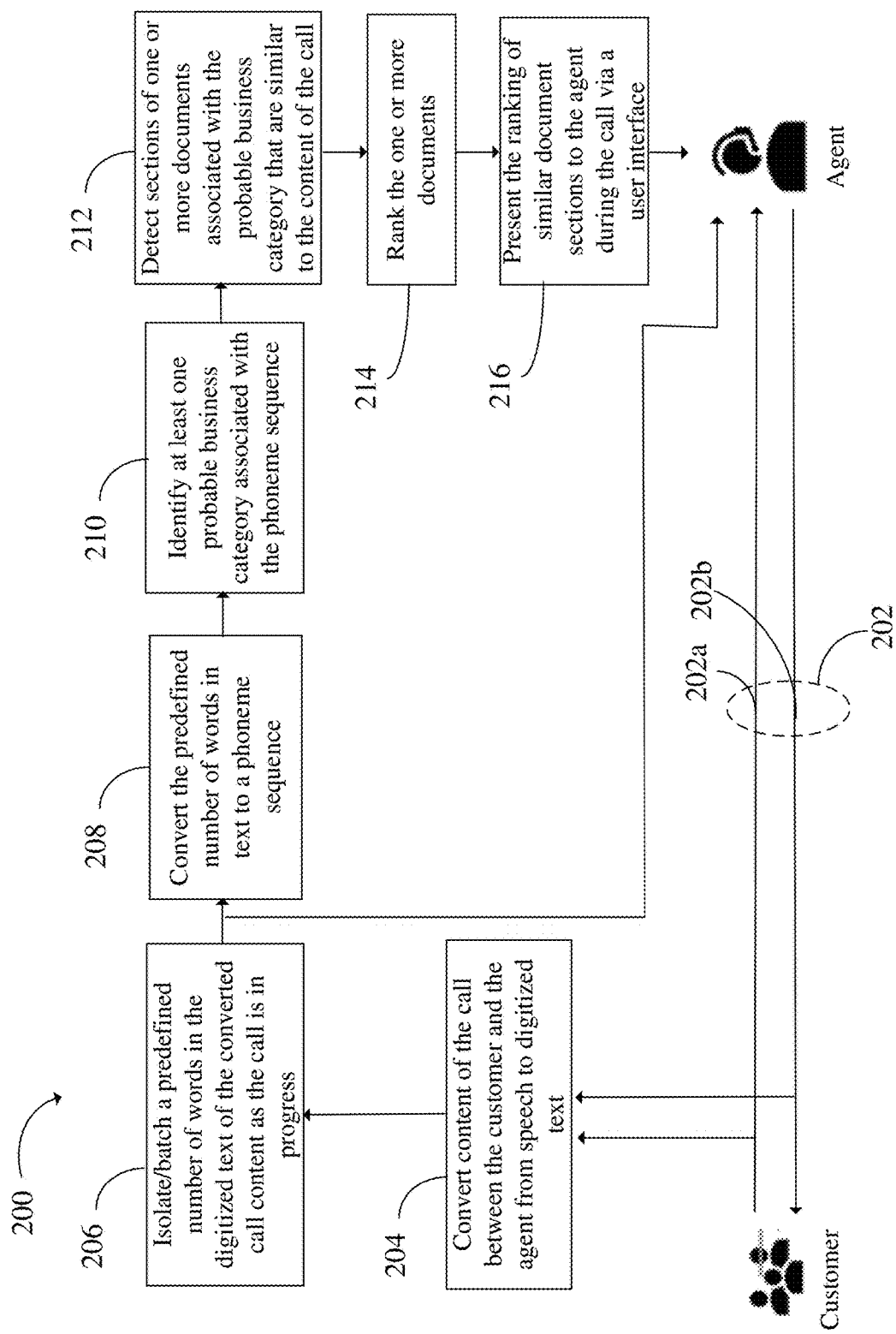
FIG. 2 shows an exemplary process utilized by the intelligent voice assistant system of FIG. 1 to automatically determine information relevant to a call between a customer and a call agent as the call progresses, according to some embodiments of the present invention.

FIG. 2 shows an exemplary process 200 utilized by the intelligent voice assistant system 100 of FIG. 1 to automatically determine information relevant to a call between a customer and a call agent as the call progresses, according to some embodiments of the present invention. The process 200 starts at step 202 with a call initiated between a customer and a call agent. The call can be conducted over different channels, where the customer communicates with the agent over a customer call channel 202a and the agent communicates with the customer on a separate customer representative channel 202b. In some embodiments, the content of the call on each of the customer call channel 202a and the customer representative channel 202b is analyzed by the intelligent voice assistant system 100 and fed back to the call agent in real-time (or near real-time) as the call progresses.

At step 204, the speech transcription module 114 of the intelligent voice assistant system 100 is configured to convert the captured speech by both the customer and the call agent to digitized text in real time (or in near real-time) as the call progresses and forward the digitized text to the batching module 116, also in real time (or in near real-time). In some embodiments, the speech transcription module 114 utilizes one or more artificial intelligence (AI) speech recognition models (e.g., NeMo by Nvidia) that are built and trained for such speech-to-text conversion. In some embodiments, the converted text is also forwarded to the call agent for review of what has been discussed.

At step 206, the batching module 116 is configured to monitor the digitized text transcription forwarded by the speech transcription module 114 for both the call agent and the customer and isolate a specific number of words transcribed/spoken in a specific duration as the call progresses. More specifically, the batching module 116 can keep a count of the number of words received, and if this count reaches a predetermined number threshold (e.g., 25 words), these words are passed to the phoneme conversion module 118 for further processing. The batching module 116 then repeats the batching process by processing the next batch of converted text stream received from the speech transcription module 114 for subsequent delivery to the phoneme conversion module 118.

At step 208, the phoneme conversion module 118 is configured to automatically convert the batch of predefined number of words in text to an equivalent phoneme sequence (i.e., a sequence of units of sound for these words). Such phoneme sequence conversion can be accomplished by applying a trained transformer model based on neural networks to convert (i) the predefined number of words to a grapheme representation and (ii) the resulting grapheme representation to the phoneme sequence. For example, the phoneme conversion module 118 can utilize a trained transformer model that performs grapheme-to-phoneme (G2P) conversion to generate pronunciation for words based their written form. In some embodiments, the transformer model architecture eschews recurrent neural networks and relies instead on an attention mechanism to draw global dependencies between inputs and outputs. In general, representing text transcriptions at phoneme level is advantageous because phonemes can capture pronunciation similarities among words that are often neglected in word-level representations (e.g., word embeddings).

At step 210, the phoneme-based domain detection module 120 is configured to identify at least one probable business category associated with each phoneme sequence generated by the phoneme conversion module 118, where the probable business category is representative of the topic being discussed between the customer and call agent for the segment of conversation captured. In some embodiments, one or more electronic documents are already assigned to and associated with that business category. In some embodiments, the probable business category is identified by the domain detection module 120 by applying a multi-stage convolutional neural network (CNN) trained to predict relationships between phoneme sequences and business domains of the enterprise where the call agent works. An exemplary training process of the CNN model involves first text processing by converting labels (i.e., business categories) to one-hot encoded vectors and using a tokenizer to create word→index dictionary, where each word in corpus can be assigned to a unique number. Then a word-to-vector model can be created followed by creation of an embedding matrix of a certain length. An exemplary process for creating the CNN following the training process involves creating a number (e.g., 4) of CNN layers with a certain filter size (e.g., 128). The kernel for the four layers can be of size 3, 6, 9 and 15 respectively. The features from the convolution filters for the different layers can be concatenated and max polling can be applied on it. The output of the convolution filters can be passed to a dense layer of a certain size (e.g., 256). The output of the dense layer is then fed to a dropout layer with a certain dropout rate (e.g., 0.5). The output of the dropout filter is subsequently passed to a soft-max layer to predict a label.

In some embodiments, the CNN model is a multi-stage model. The number of stages can be increased or decreased based on dataset distribution. As an example, for the first stage, the phoneme-based domain detection module 120 can provide as input to the CNN model phonemes of length 20 (0-20), for the second stage phonemes of length 45 (0-45) and for the final stage phonemes of length 65 (0-65). The domain detection module 120 can ensure that whole word phoneme representations are provided as inputs to the CNN model. In case of incomplete phoneme lengths, padding can be applied. In some embodiments, phonemes of length 20 and 45 are chosen to replicate the scenario where the speech transcription module 114 is forwarding streaming phonemes in a time frame around 200 ms. In the last stage, phonemes of length 65 are chosen as they correspond to about 7-8 words on average and are likely to be sufficient to predict a correct domain.

In some embodiments, a stacked model is created using a set of multiple ones of the CNN models ("sub-models"), such as three sub-models. Each of the three CNN models can come together to form the "multi-stage" CNN model. The aim is to capture the overall context of the conversation between the customer and the representative. This can be accomplished by (i) preparing a training dataset for the stacked model and (ii) using the prepared training dataset to fit the model. The training dataset can be prepared by providing examples from the test set to each of the sub-models and collecting the predictions. As an example, each sub-model can output seventeen predictions for each example for the probabilities that a given example belongs to each of the seventeen classes. Therefore, 3,564 examples are adapted to result in three arrays with the shape [3564, 17]. More specifically, these arrays can be combined into a three-dimensional array with the shape [3564, 3, 17] that stacks each new set of predictions. In some embodiments, an input to the new stacked model has a certain number of examples (e.g., 3564 examples) with some number of features. Given three sub-models are used to create the stacked model and each sub-model makes seventeen predictions per example, this generates 51 (3×17) features for each example provided to the sub-models. The [3564, 3, 17] shaped predictions are then transformed from the sub-models into a [3564, 51] shaped array to be used to train the stacked model and flatten the final two dimensions. In some embodiments, logistic regression is applied using a one-vs-rest scheme to generate the trained stacked model.

In some embodiments, the domain detection module 120 supplies as an input a phoneme sequence (from step 210) to the trained multi-stage stacked model and receives as an output identification of a probable business category for classifying the phoneme sequence. In addition, the probable business category can be associated with a set of one or more electronic documents that are assigned to that business category (i.e., share the same business topic). In some embodiments, these documents are stored in the database 108 in correspondence with their respective business categories.

At step 212, the similarity detection module 122 is configured to detect sections of the one or more electronic documents of the identified business category that are similar in content to the ongoing call. In some embodiments, the similar document sections are determined in batches in real time (or near real time) as the call progresses, where each batch corresponds to a phoneme sequence that is representative of a predetermined number of words isolated from the call as the call progresses (at step 206). These similar sections can be presented to the call agent for perusal during the call. In some embodiments, the similarity detection module 122 uses a Siamese neural network model to determine such similarities. A Siamese neural network model is a class of neural network architecture that includes two or more identical subnetworks (i.e., the same configuration with the same parameters and weights, and parameter updating is mirrored across both subnetworks). In some embodiments, the Siamese neural network model utilized by the domain detection module 120 is a deep Siamese Bidirectional long-short term memory (LSTM) network model configured to capture phrase/sentence similarity using phoneme embeddings. In some embodiments, the deep Siamese Bidirectional LSTM network model is trained using datasets in phonemes and is configured to detect similarities in phoneme representations of text. Thus, given as an input a phoneme sequence parsed from the ongoing call between the customer and the call agent, the Siamese neural network model is able to determine one or more sections of the electronic documents in the same business category that have similar content as the input phoneme sequence. For example, these similar document sections can have similarity scores that are within a predefined similarity threshold.

At step 214, the similarity detection module 122 can further rank these similar sections and their corresponding documents based on their respective similarity scores calculated using the Siamese neural network model. This ranking reflects the degrees of relevancy between the similar document sections and the phoneme sequence extracted from each batch of words from the call.

Figure 3:
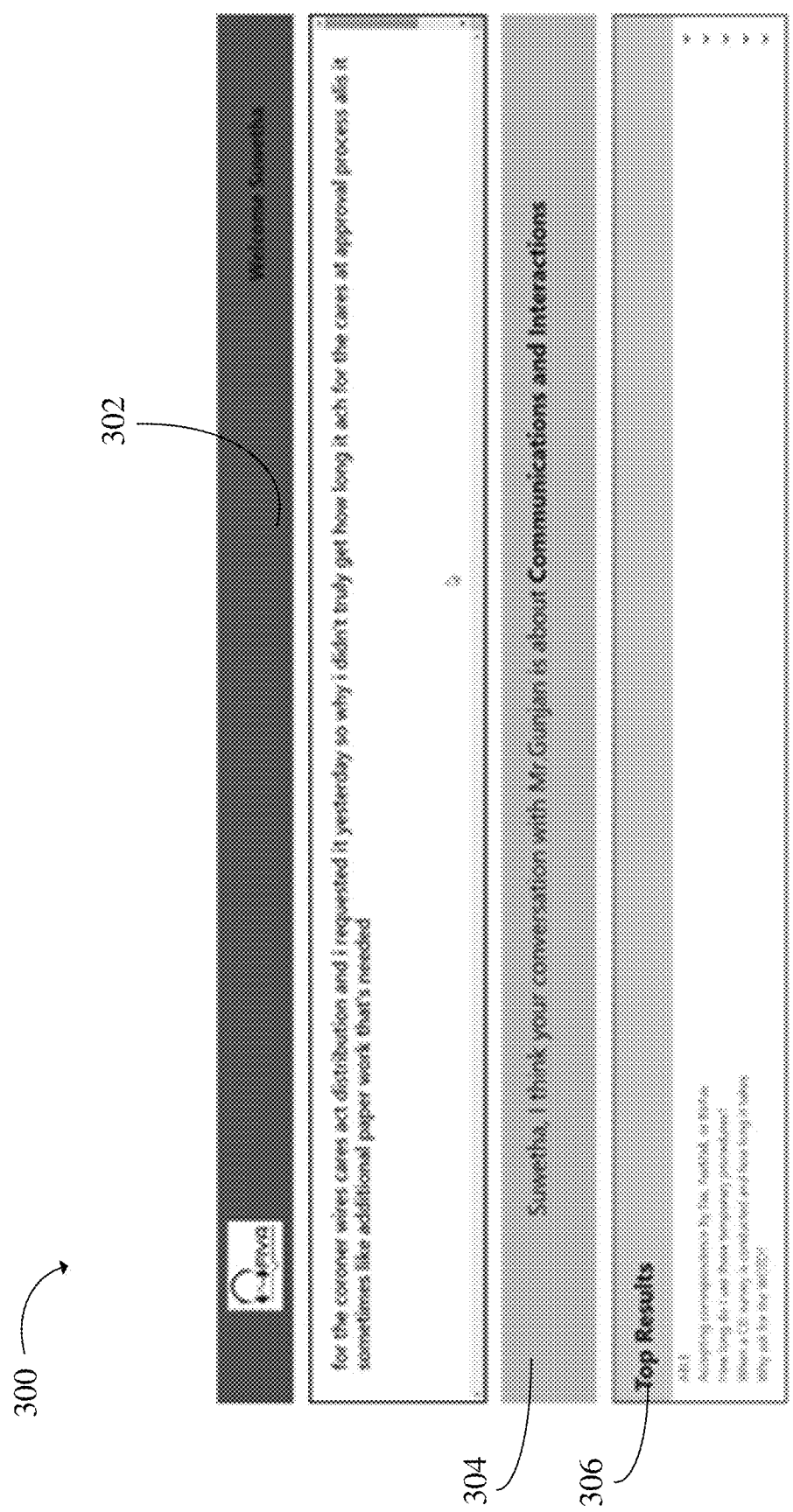
FIG. 3. Shows an exemplary graphical user interface configured to provide a ranked list of similar document sections to a call agent during an ongoing call, where the list is generated using the process of FIG. 2, according to some embodiments of the present invention.

At step 216, the intelligent voice assistant system 100 is further configured to present the ranking of similar document sections and/or documents to the agent during the call via a graphical user interface (GUI) associated with the agent. FIG. 3. Shows an exemplary GUI 300 configured to provide a ranked list of similar documents/document sections to a call agent during an ongoing call, where the list is generated using the process 200 of FIG. 2, according to some embodiments of the present invention. As shown, the GUI 300 has several display sections, including a chat transcript display section 302 populated in real time (or near real time) with a customer-side chat segment. The chat segment can be provided by the batching module 116 after it isolates the words and converts them to digitized text at step 206 of process 200. The GUI 300 can also include a domain display section 304 which shows the probable business category associated with the text batch in the chat transcript display section 302. The probable business category can be identified by the domain detection module 120 at step 210 of process 200. The GUI 300 can further include a top results display section 306 showing links to certain documents within the probable business category identified in the domain display section 304 of the GUI 300. These documents include sections that have similar content as the text batch shown in the chat transcript section 302. In some embodiments, these documents can include answers to questions raised during the conversation between the customer and the call agent. In some embodiments, the top results display section 306 can rank the links in accordance with their corresponding degrees of relevance to the call segment displayed in the chat transcript display section 302. Such ranking can be performed at step 214 of process 200. In some embodiments, upon the call agent clicking on a link, the GUI 300 is configured to invoke the corresponding document with the similar section highlighted within the document.

Referring back to process 200 of FIG. 2, the feedback loop illustrated in FIG. 2 is adapted to continue throughout the entire conversation between the customer and the call agent, where each loop provides a new batch of conversation snippet for analysis and similar content determination. Thus, the GUI 300 of FIG. 3 can be continuously updated as the call progress to display updated client-side conversation as well as business category identification and similar content identification pertinent to the updated conversation. In general, most relevant elements related to the ongoing conversation is displayed on the screen for access by the call agent.

Figure 4A:
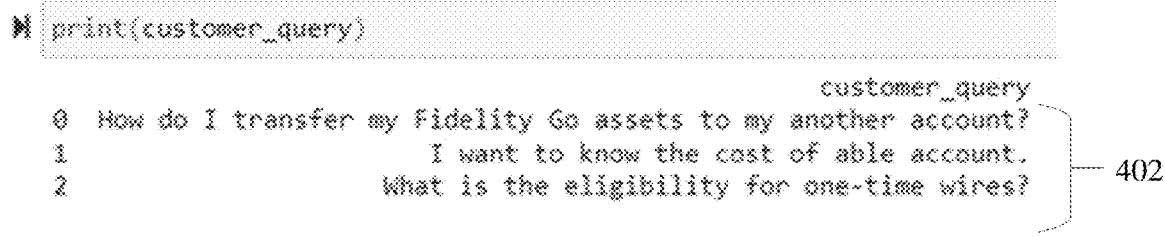
FIGS. 4a-e show an exemplary implementation of the process of FIG. 2 at various stages of the process to automatically determine information relevant to a call between a customer and a call agent, according to some embodiments of the present invention.
Figure 4B:
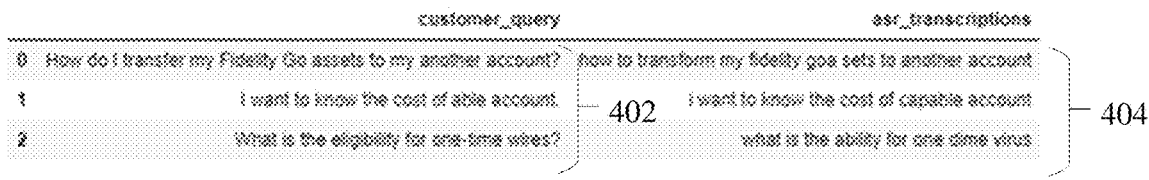
Figure 4C:
Figure 4D:
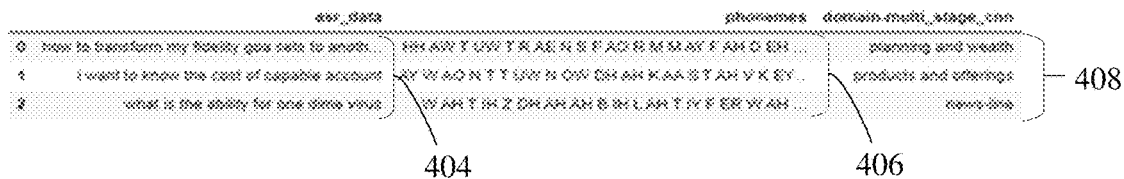
Figure 4E:
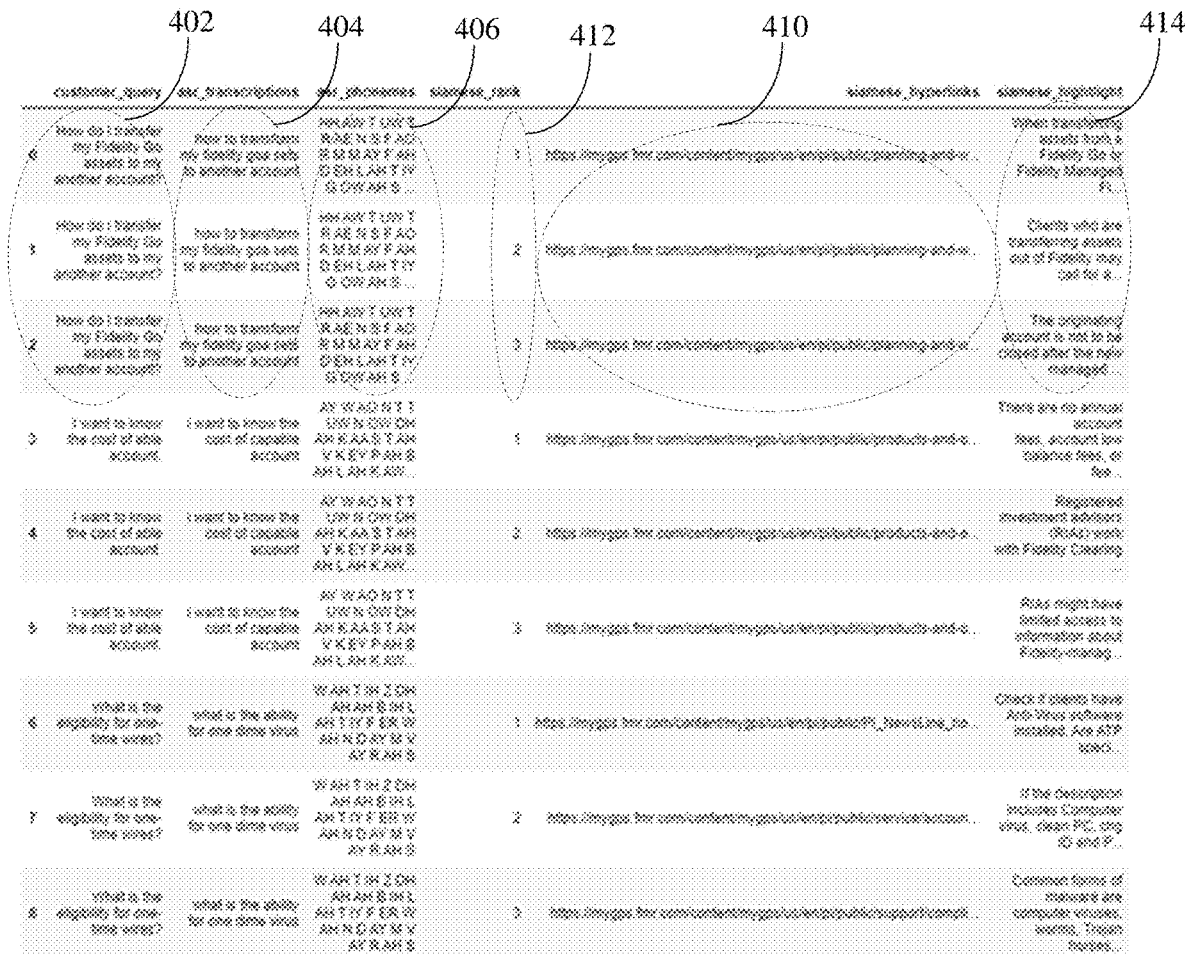

FIGS. 4a-e show an exemplary implementation of the process 200 of FIG. 2 at various stages of the process 200 to automatically determine information relevant to a call between a customer and a call agent, according to some embodiments of the present invention. FIG. 4a shows a list of three exemplary customer queries 402 parsed and transcribed into digitized text from a call in progress between a customer and an agent (using steps 202 and 204). FIG. 4b shows the text transcriptions 402 of FIG. 4a processed into batches 404 (using step 206). FIG. 4c shows conversion of the batches of text 404 into their corresponding phoneme sequences 406 (using step 208). FIG. 4d shows identification of at least one probable business category 408 for each of the phoneme sequences 406 using a multi-stage CNN artificial intelligence modeling technique (step 210). FIG. 4e shows, for each probable business category 408, identification of three pertinent document sections 410 with hyperlinks for accessing these sections (using step 212) as well as a ranking 412 of the three document sections 410 in order of similarity to the corresponding business category (using step 214). In some embodiments, as shown in FIG. 4e, a highlight/summary 414 of each three document sections 410 is also provided.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile computing device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile computing device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

The invention claimed is:

1. A computer-implemented method for recommending at least one pertinent electronic document for supporting a call between a customer and an agent, the method comprising:
   converting in real time, by a computing device, content of the call between the customer and the agent from speech to digitized text;
   isolating, by the computing device, a predefined number of words in the digitized text of the converted call content as the call is in progress;
   converting, by the computing device, the predefined number of words in text to a phoneme sequence;
   identifying, by the computing device, at least one probable business category associated with the phoneme sequence, wherein the probable business category is associated with one or more documents;
   detecting, by the computing device, sections of the one or more documents that are similar to the content of the call;
   ranking, by the computing device, the one or more documents based on corresponding degrees of relevancy between the similar sections of respective ones of the documents and the content of the call; and
   presenting, by the computing device, the ranking to the agent during the call via a user interface.

2. The computer-implemented method of claim 1, wherein the similar document sections are determined in batches in real time as the call progresses, each batch relating to the predetermined number of words isolated from the call as the call progresses.

3. The computer-implemented method of claim 1, wherein converting the predefined number of words from text to a phoneme sequence comprises applying a trained transformer model based on neural networks that is configured to convert (i) the predefined number of words to a grapheme representation and (ii) the grapheme representation to the phoneme sequence.

4. The computer-implemented method of claim 1, wherein identifying the at least one probable business category comprises applying a multi-stage convolutional neural network trained to predict relationships between phoneme sequences and business domains.

5. The computer-implemented method of claim 1, wherein detecting the sections of the one or more documents that are similar to the content of the call comprises applying a Siamese bidirectional long short term memory (LSTM) network model to capture phrase similarity using phoneme embedding.

6. The computer-implemented method of claim 5, wherein the Siamese bidirectional LSTM model is trained to detect similarities in phoneme representations of text.

7. The computer-implemented method of claim 1, wherein the user interface includes: (i) a chat transcription section displaying in real time client-side conversation to the agent and (ii) a domain section identifying the at least one business category pertinent to the conversation displayed in the chat transcriptions section.

8. The computer-implemented method of claim 7, wherein the user interface further comprises a Top Results section configured to display links to the documents in the at least one pertinent business category that include the similar content, wherein the links are ranked in accordance with the corresponding degrees of relevancy between the documents and the content of the call.

9. The computer-implemented method of claim 8, wherein the similar content of each linked document is highlighted within each document.

10. The computer-implemented method of claim 7, further comprising updating the user interface as the call progresses with updated client-side conversation as well as business category identification and similar content identification pertinent to the updated conversation.

11. A computer-implemented system for recommending at least one pertinent electronic document for supporting a call between a customer and an agent, the computer-implemented system comprising a computing device having a memory for storing instructions, wherein the instructions, when executed, configure the computer-implemented system to provide:
   a speech transcription module configured to convert in real time content of the call between the customer and the agent from speech to digitized text;
   a batching module configured to isolate a predefined number of words in the digitized text of the converted call content as the call is in progress;
   a phoneme conversion module configured to convert the predefined number of words in text to a phoneme sequence;
   a phoneme based domain detection module configured to identify at least one probable business category associated with the phoneme sequence, wherein the probable business category is associated with one or more documents;
   a phoneme based similarity detection module configured to detect sections of the one or more documents that are similar to the content of the call; and
   a user interface configured to present to the agent during the call a ranking of the one or more documents based on corresponding degrees of relevancy between the similar sections of respective ones of the documents and the content of the call.

12. The computer-implemented system of claim 11, wherein the similarity detection module is configured to determine similar document sections in batches in real time as the call progresses, each batch relating to the predetermined number of words isolated by the batching module.

13. The computer-implemented system of claim 11, wherein the phoneme conversion module converts the predefined number of words by applying a trained transformer model based on neural networks configured to convert (i) the predefined number of words to a grapheme representation and (ii) the grapheme representation to the phoneme sequence.

14. The computer-implemented system of claim 11, wherein the domain detection module is configured to identify the at least one probable business category by applying a multi-stage convolutional neural network trained to predict relationships between phoneme sequences and business domains.

15. The computer-implemented system of claim 11, wherein the similarity detection module is configured to detect the sections of the one or more documents that are similar to the content of the call by applying a Siamese bidirectional long short term memory (LSTM) network model to capture phrase similarity using phoneme embedding.

16. The computer-implemented system of claim 15, wherein the similarity detection module trains the Siamese LSTM network model to detect similarities in phoneme representations of text.

17. The computer-implemented system of claim 11, wherein the user interface comprises:
   a chat transcription section displaying in real time client-side conversation to the agent; and
   a domain section identifying the at least one business category pertinent to the conversation displayed in the chat transcription section.

18. The computer-implemented system of claim 17, wherein the user interface further comprises a Top Results section configured to display links to the documents in the at least one pertinent business category that include the similar content, wherein the links are ranked in accordance with the corresponding degrees of relevancy between the documents and the content of the call.

19. The computer-implemented system of claim 18, wherein the similar content of each linked document is highlighted within each document.

20. The computer-implemented system of claim 18, wherein the user interface is configured to update one or more of the chat transcription section, the domain section and the Top Results section as the call progresses.

* * * * *

UNITED STATES PATENT AND TRADEMARK OFFICE
CERTIFICATE OF CORRECTION

PATENT NO. : 12,387,729 B2  
APPLICATION NO. : 18/086742  
DATED : August 12, 2025  
INVENTOR(S) : Vaishnavi Mysore Sridhar et al.

Page 1 of 1

It is certified that error appears in the above-identified patent and that said Letters Patent is hereby corrected as shown below:

On the Title Page

Item (72) Inventors - reads:  
"Vaishnavi Mysore Sridhar, Karnataka (IN);  
Anupriya Gupta, Uttar Pradesh (IN);  
Gunjan Narulkar, Karnataka (IN);  
Ankur Jaiswal, Maharashtra (IN);  
Suwetha Selvakumar, Tamil Nadu (IN);  
Mari Pavithra, Tamil Nadu (IN)"

Should read:  
-- Vaishnavi Mysore Sridhar, Bangalore (IN);  
Anupriya Gupta, Fatehpur (IN);  
Gunjan Narulkar, Bangalore (IN);  
Ankur Jaiswal, Yavatmal (IN);  
Suwetha Selvakumar, Chennai (IN);  
Mari Pavithra, Thoothukudi (IN) --

Signed and Sealed this  
Sixteenth Day of December, 2025

John A. Squires  
*Director of the United States Patent and Trademark Office*